(12) United States Patent
Podlyas et al.

(10) Patent No.: US 8,804,533 B2
(45) Date of Patent: Aug. 12, 2014

(54) TECHNIQUES FOR WI-FI ACCELERATION IN RESIDENTIAL GATEWAYS

(75) Inventors: Yuri Podlyas, Kfar Saba (IL); Gil Benamar, Kibutz Bahan (IL); Yoav Levy, Givat-Shapira (IL); Doron Tal, Kfar Shmaryahu (IL)

(73) Assignee: Broadcom Corporation, Irvine, CA (US)

( * ) Notice: Subject to any disclaimer, the term of this patent is extended or adjusted under 35 U.S.C. 154(b) by 706 days.

(21) Appl. No.: 12/979,587

(22) Filed: Dec. 28, 2010

(65) Prior Publication Data

US 2012/0163183 A1    Jun. 28, 2012

(51) Int. Cl.
*H04L 1/00* (2006.01)
*H04W 24/00* (2009.01)

(52) U.S. Cl.
USPC .......................................... 370/241; 455/423

(58) Field of Classification Search
USPC .......................................................... 370/241
See application file for complete search history.

(56) References Cited

U.S. PATENT DOCUMENTS

| | | | |
|---|---|---|---|
| 6,810,520 B2 | 10/2004 | Lu et al. | |
| 6,839,345 B2 | 1/2005 | Lu et al. | |
| 7,397,797 B2 | 7/2008 | Alfieri et al. | |
| 8,064,413 B2 * | 11/2011 | Savoor et al. | 370/338 |
| 8,107,414 B2 * | 1/2012 | Wang et al. | 370/328 |
| 8,249,452 B2 * | 8/2012 | Biegert et al. | 398/58 |
| 8,553,662 B2 * | 10/2013 | Chen et al. | 370/338 |
| 2008/0279188 A1 | 11/2008 | Alfieri et al. | |
| 2009/0044240 A1 * | 2/2009 | Sniezko et al. | 725/111 |
| 2009/0047016 A1 * | 2/2009 | Bernard et al. | 398/43 |
| 2010/0105379 A1 * | 4/2010 | Bonner et al. | 455/433 |
| 2010/0239251 A1 * | 9/2010 | Biegert et al. | 398/58 |
| 2011/0211584 A1 * | 9/2011 | Mahmoud | 370/401 |
| 2012/0044914 A1 * | 2/2012 | Chen et al. | 370/338 |
| 2013/0301627 A1 * | 11/2013 | Chen et al. | 370/338 |

* cited by examiner

*Primary Examiner* — Guang Li

(74) *Attorney, Agent, or Firm* — Sterne, Kessler, Goldstein & Fox P.L.L.C.

(57) ABSTRACT

A method for acceleration of wireless communication in a residential gateway, the residential gateway enables communication between a plurality of subscriber devices connected in a wireless local area network (WLAN) and a passive optical network (PON). The method comprises pre-configuring a wireless controller to intercept networking functions programmed in a wireless stack of a wireless driver, wherein the wireless controller and the wireless driver are components of a kernel of an operating system executed by a host processor; monitoring system calls initiated by the wireless driver to the kernel; for each monitored system call, checking if a system call is a request for a networking function; and forwarding the system call for a network function to a packet processor.

20 Claims, 4 Drawing Sheets

US 8,804,533 B2

TECHNIQUES FOR WI-FI ACCELERATION IN RESIDENTIAL GATEWAYS

TECHNICAL FIELD

The present invention relates generally to acceleration of wireless communication, and more particularly to acceleration of wireless communication in residential gateways.

BACKGROUND OF THE INVENTION

Telecommunication and cable companies offer to their subscribers a bundle of high-speed data services. These services typically include a bundle of TV broadcasting, Internet, and telephone. With this aim, telecommunication companies implement high-speed optical networks. An example for such a network is the Gigabit PON (GPON) currently being adopted by many telecommunication companies in order to deliver high-speed data services to their subscribers.

To provide bundled high-speed data services a residential gateway is installed in the premises. Generally, a residential gateway may provide the functionality of a modem and router and may be, for example, a cable modem, a router, a switch, a wireless modem, a wireless router, and so on. The residential gateway may be connected to a network unit, e.g., an optical network unit (ONU) or integrated with the network unit. An example of a GPON residential gateway that is capable of processing GPON traffic and perform residential tasks can be found in U.S. Pat. No. 7,801,161 entitle "Gigabit passive optical network (GPON) residential gateway," assigned to the common assignee of the present application, and which is hereby incorporated for all that it contains.

As mentioned above, one of the tasks of a residential gateway is to support wireless local area network (WLAN) based on the IEEE 802.11 standard family (also known as "Wi-Fi"). There are two types of Wi-Fi stacks, a soft-MAC and a hard-MAC. A protocol stack is a particular software implementation of a computer networking protocol (e.g., IEEE 802.11) suite. In a soft-MAC, the code is executed by the host processor, thus heavily consumes valuable processing resources. The alternative is the hard-MAC in which a dedicated processor runs the entire Wi-Fi stack's code, thus freeing the host processor to perform other network tasks. However, the disadvantage of the hard-MAC is an additional cost.

Wi-Fi enabled devices, such as laptop computers are equipped with relatively powerful processors and large amounts of memory, thus soft-MAC implementation is feasible without degrading the overall performance. However, in residential gateways, the computing power of the host processor is limited. Thus, full implementation of a Wi-Fi soft-MAC in a residential gateway will increase the utilization of the host processor and degrade the performance of the device. On the other hand, implementation of a Wi-Fi hard-MAC is not a desired solution as it would require designing residential gateways with a dedicate processor, thereby increasing the cost of such devices.

Therefore, it would be advantageous to provide an efficient solution for Wi-Fi acceleration in residential gateways.

SUMMARY OF THE INVENTION

Certain embodiments of the invention include a method for acceleration of wireless communication in a residential gateway, the residential gateway enabling communication between a plurality of subscriber devices connected in a wireless local area network (WLAN) and a passive optical network (PON). The method comprises pre-configuring a wireless controller to intercept networking functions programmed in a wireless stack of a wireless driver, wherein the wireless controller and the wireless driver are components of a kernel of an operating system executed by a host processor; monitoring system calls initiated by the wireless driver to the kernel; for each monitored system call, checking if a system call is a request for a networking function; and forwarding the system call for a network function to a packet processor.

Certain embodiments of the invention also include a residential gateway connected to a passive optical network (PON) and a plurality of subscriber devices communicating at least through a wireless local area network (WLAN). The residential gateway comprises a wireless interface network card (WNIC) for communicating with the plurality of devices over a wireless medium; a PON medium access control (MAC) adapter for interfacing with the PON; a packet processor; and a host processor executing an operating system, wherein a kernel of the operating system hosts a wireless controller and a wireless adapter, the wireless controller is adapted to accelerate wireless communication with the plurality of subscriber devices by: monitoring system calls initiated by the wireless driver to the kernel; for each monitored system call, checking if a system call is a request for a networking function; forwarding the system call for a networking function to the packet processor; and allowing execution of the system call by the host process if the system call is not a request for a networking function.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
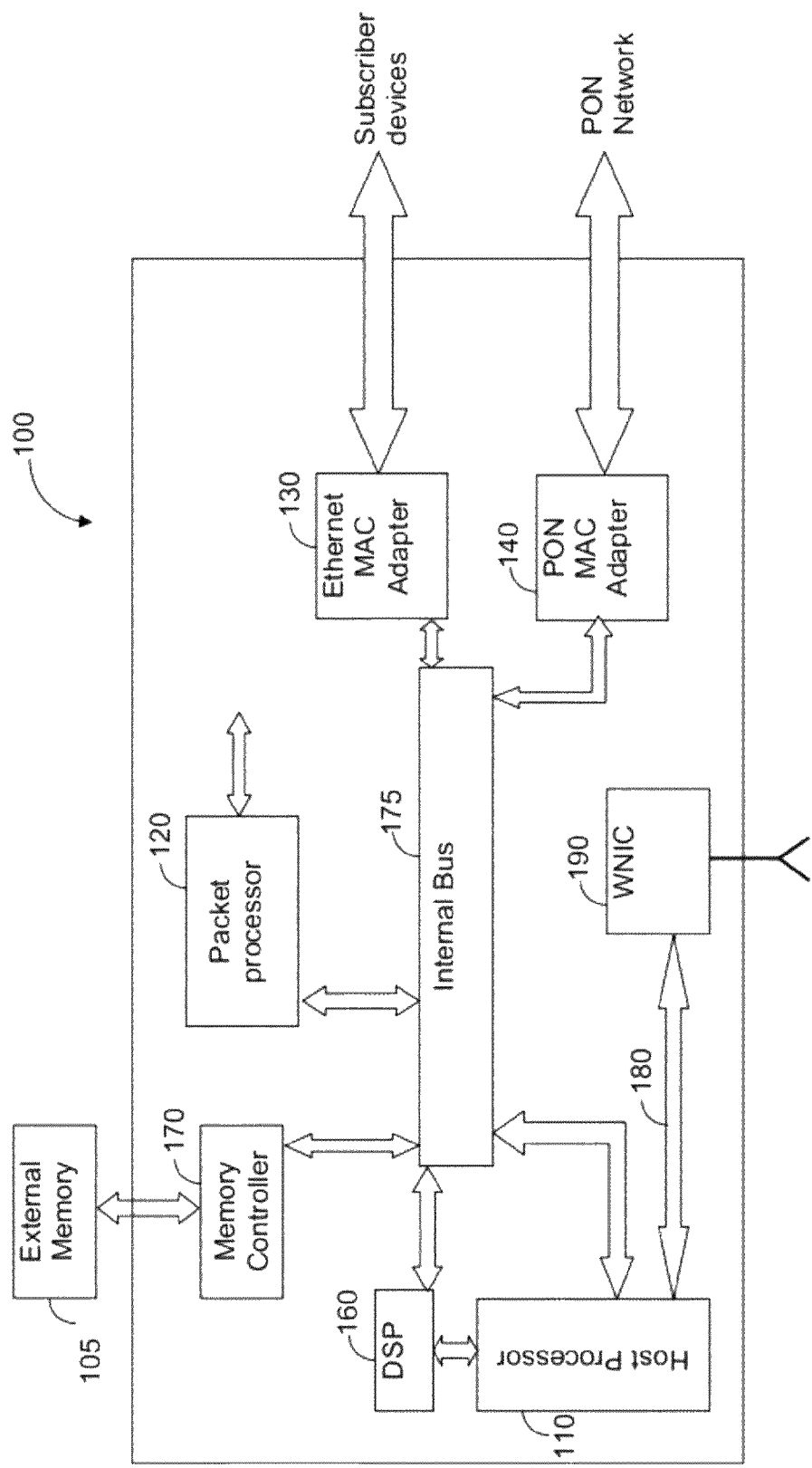
FIG. 1 is a schematic diagram of a residential gateway.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a schematic block diagram of a passive optical network (PON) residential gateway 100 utilized to describe various embodiments of the invention. The PON residential gateway 100 handles traffic flows between the PON and subscriber devices. A subscriber device may be, for example, a telephone device, a computer connected to a local area network (LAN), a wireless LAN (WLAN), or a combination thereof, and a set-up box. The PON residential gateway 100 includes a host processor 110, a packet processor 120, an Ethernet media access control (MAC) adapter 130, a PON MAC adapter 140, a digital signal processor (DSP) 160, and a memory controller 170 that interacts with an external memory 105. The various components of the gateway 100 communicate through an internal bus 175.

The residential gateway 100 further includes a peripheral bus 180 connected to a wireless network interface card (WNIC) 190. The peripheral bus 180 may be, but is not limited to, a PCI, PCI-Express, and the like. The WNIC 190 is a network card which is enabling communication via a WLAN. The WNIC 190 provides the MAC and physical (PHY) connectivity layers for a wireless network using a radio frequency (RF) circuitry and an antenna.

The packet processor 120 performs tasks including, for example, bridging, IP routing, Network address translation, queuing and shaping of packets. Data processed by the packet processor 120 may be either an upstream flow, i.e., data sent from a subscriber device connected to the gateway 100, or a downstream flow, i.e., data sent from the PON to a subscriber device. The packet processor 120 is a dedicated piece of hardware designed to accelerate the processing of packets belonging to a certain flow. In certain implementations, the packet processor 120 is programmable using firmware, which comprises low-level execution code (e.g., assembly or any proprietary programming language).

The host processor 110 executes tasks that are typically related to management of connections handled by the gateway 100. For example, such tasks include, but are not limited to, opening/closing connections, controlling the state of a connection, identifying traffic received on a new connection, and so on. Such operations generally do not require processing of individual packets belonging to a certain flow. For example, if the host processor 110 identifies a packet received on a new connection, then the processing of the first packet will be performed by the host processor 110 and subsequent packets are handled only by the packet processor 120. The host processor 110 is typically a general-purpose central processing unit (CPU) that is programmable to execute software that includes high-level programming language over an operation system. In certain implementations, the host processor 110 may be a high-performance MIPS CPU including an instruction cache and a data cache.

The Ethernet MAC adapter 130 includes a plurality of Ethernet interfaces for interfacing with a plurality of subscriber devices. These interfaces may be, but are not limited to, 100 Mbit Ethernet, 1 Gigabit Ethernet, 10 Gigbit Ethernet, and the like. The Ethernet MAC adapter 130 is capable of receiving an upstream data flow from subscribe devices and transmitting downstream data to subscriber devices. The PON MAC adapter 140 processes traffic in accordance with the various PON modes that include, but are not limited to, a Gigabit PON (GPON), a Broadband PON (BPON), an Ethernet PON (EPON), or any combination therefore. The PON MAC adapter 140 handles received downstream data flows and transmits upstream data flows. Either upstream or downstream data flows are respectively forwarded to, or received from, the packet processor 120 via the internal bus 175. The host processor 110 further processes IP-TV packets, i.e., packets that include video data.

The DSP 160 is the handler of voice services and provides an interface to a telephone device connected to the gateway 100. The DSP 160 is adapted to receive and send voice samples from and to the telephone devices. Specifically, analog voice signals received from a telephone device are sampled by the DSP 160 and saved in the external memory 105. These samples are further processed by the host processor 110, which generates IP packets to include the voice data.

Similarly, the host processor 110 processes input IP packets including voice data and stores the processed packets in the memory 105. The DSP 160 retrieves the data packets from the memory and generates voice signals which are sent to the telephone device.

In accordance with certain embodiments of the invention, the processing of a Wi-Fi packet is separated between the host processor 110 and the packet processor 120. As will be demonstrated below, such an approach reduces the utilization of the host processor 110, thereby increasing the performance of the residential gateway 100. With this aim, the packet processor 120 is programmed with instructions purposely designed to accelerate the processing of all networking tasks of the Wi-Fi stack. The host processor 110 using its operating system performs all other tasks of the Wi-Fi stack.

Specifically, packets from the WNIC 190 are redirected to the packet processor 120 for bridging, local switching, and gateway functions. Thereafter, the processed packets are relayed by the packet processor 120 to other network interfaces, i.e., the Ethernet MAC adapter 130 or PON MAC adapter 140. Similarly, packets from the PON or Ethernet MAC adapters complete networking functions by the packet processor 120 and then are sent to the peripheral bus 180 for redirection to WNIC 190.

Figure 2:
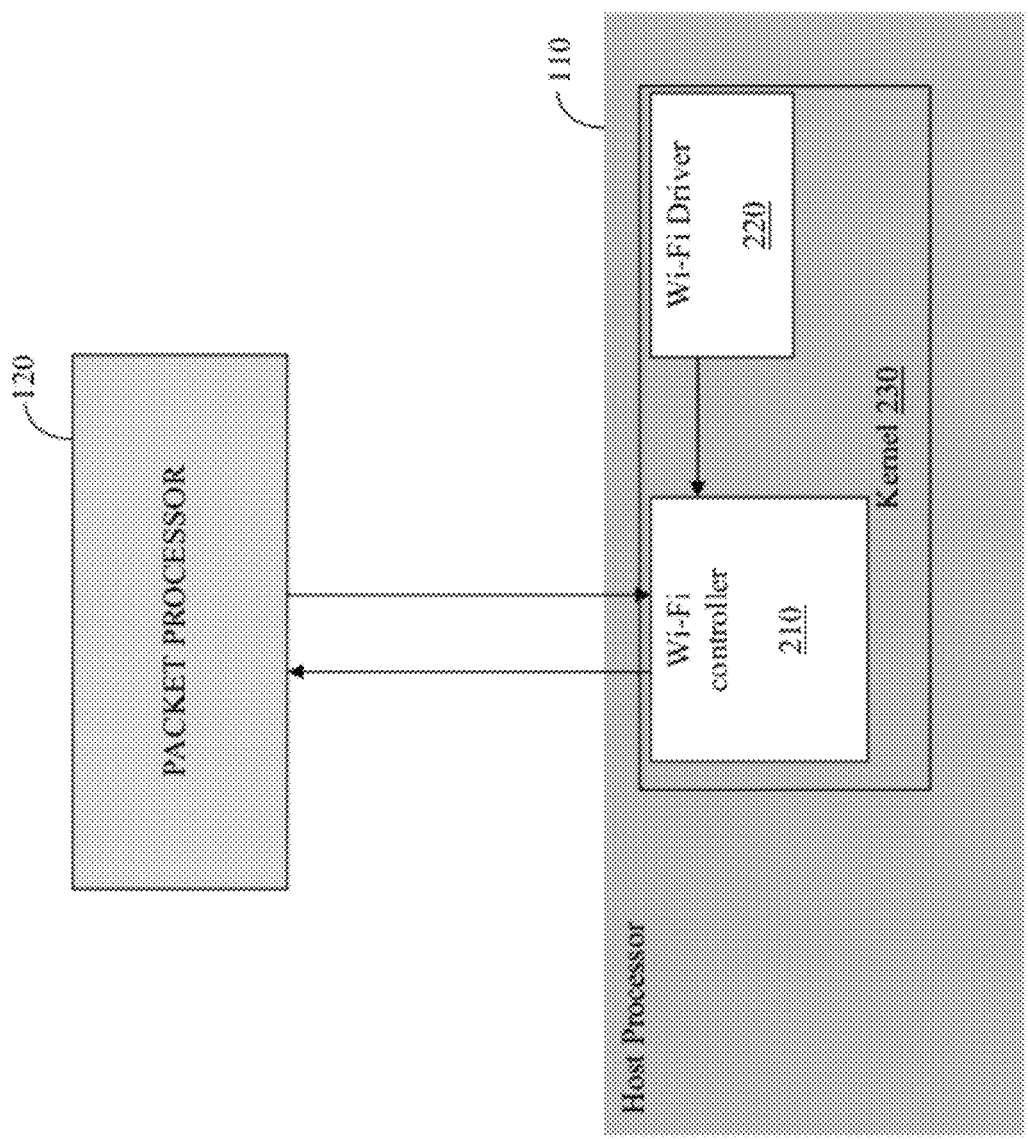
FIG. 2 is a diagram illustrating the principles of an embodiment of the invention.

FIG. 2 shows an exemplary and non-limiting functional diagram illustrating the technique for Wi-Fi acceleration in an embodiment of the invention. The acceleration technique is achieved by distributing the processing tasks of the soft-MAC between the packet processor 120 and host processor 110. As discussed above, conventional implementations of a soft-MAC are fully performed by host processor 110. In accordance with an embodiment of the invention, networking functions of the Wi-Fi stacks are performed by the packet processor 120, while radio functions are executed by the host processor 110. As a non-limiting example, "networking functions" include packet routing and packet bridging, while the "radio functions" comprise control of the wireless transceiver in the WNIC 190. The function of packet routing may be performed by, for example, classifying of incoming packets to determine their flow IDs, translating network addresses, and shaping packets to meet a certain level of quality of service (QoS).

For execution of the networking functions, the packet processor 120 may utilize a plurality of hardware accelerators (not shown) connected to the packet processor 120. Such accelerators include, but are not limited to, a MAC address lookup table, an error checking, a scheduler, and the like.

In accordance with certain embodiments of the invention, acceleration of Wi-Fi stack processing is achieved, in part, using a Wi-Fi controller 210 that interfaces between a Wi-Fi driver 220 and the packet processor 120. Both the Wi-Fi controller 210 and Wi-Fi driver 220 are components of a kernel 230. The kernel 230 is part of an operating system (e.g., Linux) executed by the host processor 110. The Wi-Fi driver 220 is typically provided by a vendor of the WNIC 190 and includes a computer program implementing the Wi-Fi stack and preferably interfaces to the peripheral bus and WLAN. The WNIC 190, the wireless stack, and the Wi-Fi driver 220 are compatible with any of the IEEE 802.11a, IEEE 802.11b, IEEE 802.1g, and IEEE 802.1n communication standard.

The Wi-Fi controller 210 intercepts system calls for networking functions of the Wi-Fi stacks and directs such system calls to the packet processor 120, thus eliminating execution of such functions by the host processor 110. The Wi-Fi controller 210 is preconfigured with a set of commands designed to identify calls for networking functions. The formant and syntax of such system calls are different from one WNIC's vendor to another.

In accordance with another embodiment of the invention, the packet processor 120 maps MAC addresses to a service set identifier (SSID) in multiple SSIDs environment on upstream traffic. Multiple SSIDs create different WLANs where each network is isolated and may have different security and/or QoS requirements. For example, two WLANs can exist and be operable at the home where one network is for data usage and the other is for wireless IP-Phone, each network requires different QoS (e.g., VoIP versus data). Thus, in order to route packets to the correct SSID, the Wi-Fi controller 210 maps MAC addresses of packets to the SSID of the wireless network. Once the mapping is completed, the packet processor 120 sends the SSID of the destination WLAN to the Wi-Fi controller 210 which forwards such information to Wi-Fi driver.

Figure 3:
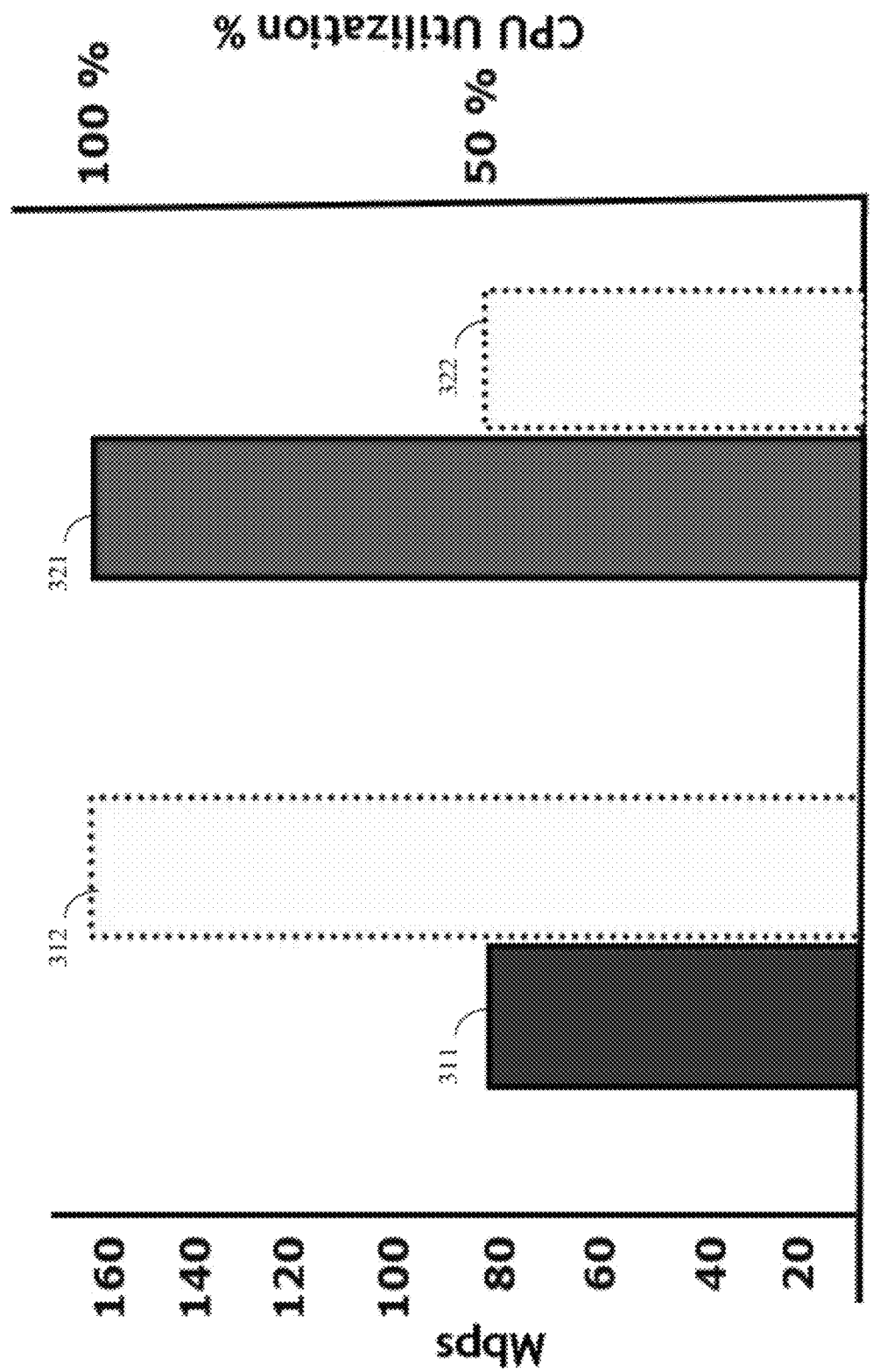
FIG. 3 is a graph illustrating the data throughput and CPU utilization of a conventional soft-MAC implementation versus an accelerated Wi-Fi implementation.

It should be appreciated by a person skilled in the art that by having the packet processor 120 perform the networking functions, the utilization of the host processor 110 and the overall performance of the gateway 100 is increased. FIG. 3 shows an exemplary graph illustrating the data throughput and CPU utilization of a conventional soft-MAC implementation versus an accelerated Wi-Fi solution implemented in accordance with an embodiment of the invention. The bars 311 and 312 respectively represent the throughput (measured in Mega bits per second (Mbps)) and utilization of a host processor (CPU) in a conventional soft-MAC implementation. The bars 321 and 322 respectively represent the throughput and utilization of a host processor (CPU) when implementing the acceleration technique disclosed herein. As can be noted the throughput of the accelerated implementation is doubled and the host processor utilization is reduced by half. Therefore, it should be appreciated by a person skilled in the art that the acceleration techniques disclosed herein provides better performance over conventional solutions.

Figure 4:
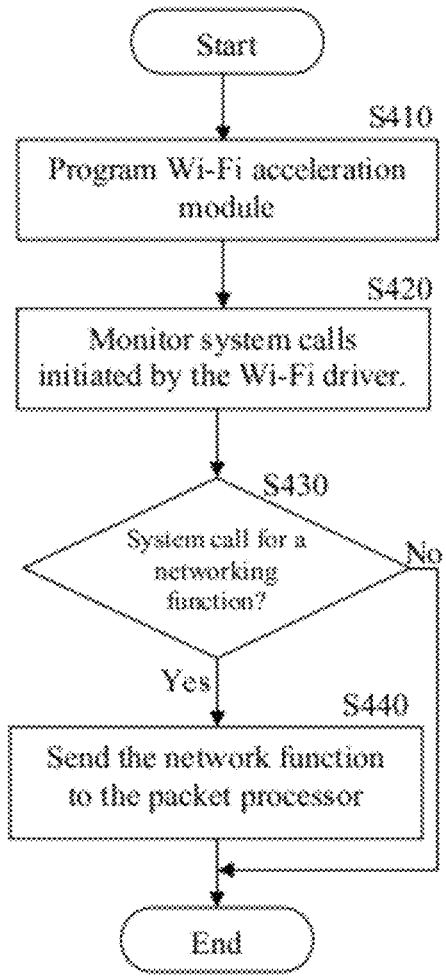
FIG. 4 is a flowchart illustrating the method for performing Wi-Fi acceleration in residential gateways in accordance with an embodiment of the invention.

FIG. 4 shows an exemplary and non-limiting flowchart 400 illustrating a method for performing Wi-Fi acceleration in residential gateways in accordance with an embodiment of the invention. At S410, the Wi-Fi controller 210 is programmed with a set of commands designed to identify system calls to network functions in the Wi-Fi stack. As mentioned above, the formant and syntax of such calls are different from one WNIC's vendor to another. At S420, during operation of the residential gateway, system calls initiated by the Wi-Fi driver 220 to the kernel 230 are monitored. At S430, for each system call, it is determined by the Wi-Fi controller 210 if the system call is a request for a networking function. A network function may include, but is not limited to, bridging or routing of packets received at the WNIC 190. If S430 results with an affirmative answer, execution continues with S440 where the system call for performing a networking function is intercepted and sent to the packet processor 120; otherwise, execution terminates.

The packet processor 120 executes the requested networking function preferably using a plurality of hardware accelerators. Once the processing is completed, the packet processor 120 sends processed packets to Ethernet MAC adapter 130, PON MAC adapter 140, or back to the WNIC 190 depending on the final destination of the packet. For example, if the packet should be transmitted to an OLT of the PON, then the packet is sent to the PON MAC adapter 140. Therefore, packets handled by the packet processor 120 are not returned to the host processor 110 for further processing.

In the opposite direction, the packet processor 120 monitors data packets received from a subscriber device in a LAN, for example through Ethernet MAC adapter 130, and packets received from the PON network through the PON MAC adapter 140, to determine if an incoming data packet should be routed to the WLAN. The determination is based, for example, on a destination MAC address belonging to a device of the WLAN. Packets that should be routed to the WLAN are sent (through a memory) to the Wi-Fi driver 220, which takes all necessary actions to wirelessly transmit the packets to a device or devices in the WLAN.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for acceleration of wireless communication in a residential gateway, the residential gateway enabling communication between a plurality of subscriber devices connected in a wireless local area network (WLAN), the method comprising:
   pre-configuring a controller to intercept a networking function programmed in a stack of a driver, wherein the controller and the driver are components of a kernel of an operating system executed by a host processor;
   monitoring a system call initiated by the driver to the kernel;
   checking whether the system call is a request for the networking function;
   forwarding the system call for the networking function to a packet processor;
   executing the networking function, only in the packet processor, to provide a processed packet;
   mapping, by the controller, a media access control (MAC) address of a subscriber device from among the plurality of subscriber devices to a service set identifier (SSID) when multiple different WLANs are supported by the residential gateway; and
   routing, by the driver, the processed packet to a destination WLAN based on the mapping.

2. The method of claim 1, further comprising:
   allowing execution of the system call by the host processor when the system call is not the request for the networking function.

3. The method of claim 1, wherein the networking function comprises at least one of: bridging of a packet and routing of a packet received through a wireless network interface card (WNIC), wherein the WNIC is included in the residential gateway.

4. The method of claim 3, further comprising:
interfacing the WNIC using an IEEE 802.11a, an IEEE 802.11b, an IEEE 802.1g, or an IEEE 802.1n communication standard.

5. The method of claim 1, further comprising:
executing the networking function in the packet processor using a plurality of hardware accelerators.

6. The method of claim 5, wherein routing comprises:
sending the processed packet from the packet processor to a wireless network interface card (WNIC).

7. A non-transitory computer readable medium having instructions stored thereon, execution of which by a computing device, cause the computing device to perform operations comprising:
pre-configuring a controller to intercept a networking function programmed in a stack of a driver, wherein the controller and the driver are components of a kernel of an operating system executed by a host processor;
monitoring a system call initiated by the driver to the kernel;
checking whether the system call is a request for the networking function;
forwarding the system call for the networking function to a packet processor; executing the networking function, only in the packet processor, to provide a processed packet;
mapping, by the controller, a media access control (MAC) address of a subscriber device to a service set identifier (SSID) when multiple different wireless local area networks (WLANs) are supported by the residential gateway; and
routing, by the driver, the processed packet to a destination WLAN based on the mapping.

8. The non-transitory computer readable medium of claim 7, further comprising:
allowing execution of the system call by the host processor only when the system call is not the request for the networking function.

9. The non-transitory computer readable medium of claim 7, wherein the networking function comprises at least one of: bridging of a packet and routing of a packet received through a wireless network interface card (WNIC), wherein the WNIC is included in a residential gateway.

10. The non-transitory computer readable medium of claim 7, further comprising:
executing the networking function in the packet processor using a plurality of hardware accelerators.

11. A residential gateway connected to a plurality of subscriber devices communicating through a wireless local area network (WLAN), the residential gateway comprising:
a packet processor configured to execute only a networking function; and
a host processor configured to execute an operating system, wherein a kernel of the operating system is configured to host a controller and a driver, wherein the controller is configured to:
monitor a system call initiated by the driver to the kernel;
check whether the system call is a request for the networking function;
forward the system call for the networking function to the packet processor;
allow execution of the system call by the host processor only if the system call is not a request for the networking function; and
map a media access control (MAC) address of a subscriber device from among the plurality of subscriber devices to a service set identifier (SSID) when multiple different WLANs are supported by the residential gateway;
wherein the driver is configured to route a processed packet from the packet processor or the host processor to a wireless network interface network card (WNIC) for routing onto a destination WLAN based on the mapping when a final destination of the processed packet is the WLAN.

12. The residential gateway of claim 11, further comprising:
an Ethernet MAC adapter configured to interface the plurality of subscriber devices connected in a local area network (LAN);
wherein the packet processor is further configured to monitor a packet received through the Ethernet MAC adapter from the subscriber device.

13. The residential gateway of claim 12, wherein the packet processor is further configured to determine whether the received packet is to be routed to the WLAN.

14. The residential gateway of claim 11, wherein the controller is preconfigured to intercept the networking function programmed in a stack of the driver.

15. The residential gateway of claim 14, wherein the WNIC, the stack, and the driver are compatible with an IEEE 802.11a, an IEEE 802.11b, an IEEE 802.1g, or an IEEE 802.1n communication standard.

16. The residential gateway of claim 11, wherein the networking function comprises at least one of: bridging of a packet and routing of a packet received through the WNIC.

17. The residential gateway of claim 16, wherein the packet processor comprises:
a plurality of hardware accelerators configured to execute the networking function.

18. The residential gateway of claim 11, wherein the residential gateway is further connected to a passive optical network (PON); and
wherein the residential gateway further comprises:
a PON medium access control (MAC) adapter configured to interface with the PON, and
wherein the packet processor is further configured to monitor a packet received through the PON MAC adapter from the PON.

19. The residential gateway of claim 18, wherein the PON is a gigabit PON (GPON).

20. The residential gateway of claim 18, wherein the packet processor is further configured to determine whether the received packet is to be routed to the WLAN.

* * * * *